(12) United States Patent
Lee

(10) Patent No.: US 7,831,248 B2
(45) Date of Patent: Nov. 9, 2010

(54) APPARATUS AND METHOD FOR DETECTING COMMUNICATION OPERATION RESULTED FROM AN ERRONEOUS CONTENT IN MOBILE PLATFORM

(75) Inventor: Hwan Kyu Lee, Kwangmyoung (KR)

(73) Assignee: Pantech Co., Ltd., Seoul (KR)

( * ) Notice: Subject to any disclaimer, the term of this patent is extended or adjusted under 35 U.S.C. 154(b) by 458 days.

(21) Appl. No.: 11/250,038

(22) Filed: Oct. 13, 2005

(65) Prior Publication Data

US 2006/0084428 A1   Apr. 20, 2006

(30) Foreign Application Priority Data

Oct. 14, 2004   (KR) .................. 10-2004-0082001

(51) Int. Cl.
   *H04W 24/00*   (2009.01)
(52) U.S. Cl. .............. 455/423; 455/410; 455/411; 455/414.1; 455/418; 455/424; 455/425; 709/238; 709/244; 713/169; 713/170; 713/182
(58) Field of Classification Search ............ 455/410, 455/411, 418, 419, 420, 414.1, 424, 425; 713/151, 161, 194; 380/247; 726/22, 23, 726/24, 25, 26, 27, 28, 29, 30, 31, 32, 33
   See application file for complete search history.

(56) References Cited

U.S. PATENT DOCUMENTS

| | | | |
|---|---|---|---|
| 7,171,491 B1 * | 1/2007 | O'Toole et al. ............. | 709/244 |
| 7,210,168 B2 * | 4/2007 | Hursey et al. .................. | 726/24 |
| 2003/0051168 A1 * | 3/2003 | King et al. ................... | 713/201 |
| 2004/0162066 A1 * | 8/2004 | Kuchibhotla et al. ........ | 455/423 |
| 2004/0225877 A1 * | 11/2004 | Huang ......................... | 713/100 |

FOREIGN PATENT DOCUMENTS

| | | |
|---|---|---|
| JP | 2003-179541 | 6/2003 |
| KR | 1020030081743 | 10/2003 |
| KR | 1020030087195 | 11/2003 |
| KR | 1020040090373 | 10/2004 |

* cited by examiner

*Primary Examiner*—Stephen M D'Agosta
(74) *Attorney, Agent, or Firm*—H.C. Park & Associates, PLC

(57) ABSTRACT

Disclosed are an apparatus and a method for detecting whether a content executed in a mobile platform of mobile communication terminal perform a communication operation without a user's reservation or permission, thereby preventing an unexpected communication operation. In this invention, if a content performs the communication operation due to its malfunction by a computer virus or a program error, the communication operation, such as voice calling or message transmission to unspecified communication terminal or access to arbitrary wireless internet server, is detected and interrupted. With the interruption of the unexpected communication operation, the user's damage, such as the payment of charges for communication services, is previously prevented. In case of the interruption of the communication operation, the user is informed of the erroneous content and the performed communication operation so that the user selects the corresponding contents to be deleted or preserved.

2 Claims, 2 Drawing Sheets

APPARATUS AND METHOD FOR DETECTING COMMUNICATION OPERATION RESULTED FROM AN ERRONEOUS CONTENT IN MOBILE PLATFORM

CROSS-REFERENCE TO RELATED APPLICATION

The present application is claiming priority of Korean Patent Application No. 10-2004-0082001, filed on Oct. 14, 2004, the content of which is herein incorporated by reference.

BACKGROUND OF THE INVENTION

1. Field of the Invention

The present invention relates to an apparatus and method for detecting that the contents executed in a mobile platform of mobile communication terminals perform a communication operation that the users do not make reservations or give permission, thereby preventing performance of the communication operation that the users do not intend to perform.

2. Background of the Related Art

With a development in hardware and software technologies associated with mobile communication terminals, the mobile communication terminals have had useful additional functions such as a game, a scheduler, a calculator, an alarm and so forth, in addition to general functions of a voice call and a message transmission. In addition, in accordance with a wireless internet access in the mobile communication terminals, the terminal users can search his favorite information at any time and place through access to internet to use contents services.

In particular, a mobile platform has been recently mounted in the mobile communication terminals so that users can download their favorite contents or applications from an internet server and operate them in mobile communication terminals.

Such mounting of the mobile platform in mobile communication terminals makes it possible for users to use more various contents services. For example, among the contents, there are contents capable of receiving a desired recipient's phone number or wireless internet address from the contents itself and performing a communication operation (e.g., voice call, message transmission, wireless internet access, etc.), without using a communication function menu realized in mobile communication terminals.

In the event of performing the communication operation in the contents itself in the mobile platform, if the users give permission or make a reservation (for example, if the users input the recipient's phone number or make a reservation of a certain communicative operation), the communication operation is generally configured to be performed in the contents. However, the contents can be malfunctioned due to computer virus or other factors because they are the programs that were downloaded from an exterior of a mobile communication terminal via a network.

In case that the contents having a function of performing a communication operation are malfunctioned, the corresponding contents may perform a series of communicative operations such as voice calling, message transmission or wireless internet access due to a malfunction even without user's reservation or permission.

We suppose, for example, that a user of a mobile communication terminal has downloaded contents capable of providing a game function to the mobile communication terminal. In this case, if the contents were fabricated to perform communicative operations such as voice calling, message transmission or wireless internet access toward some target terminal at a specific time (for example, at midnight of the 1st of every month), the mobile communication terminal having downloaded the fabricated contents would try to connect for the communicative operations. If the connection is performed, the user may suffer from unexpected damages of service charges due to the connection. Further, if the contents were downloaded by a number of users, some target terminal would receive demands for access simultaneously from a number of mobile communication terminals having the contents, and thereby the target terminal would suffer from the overload.

As described above, if the communication operation is performed without such user's reservation or permission, charges for communication service will be imposed the corresponding user and the user may suffer from unexpected damages. In addition, there is a problem that the users may suffer from other unexpected damages due to wrong performance of the communication operation and the contents of the communication (e.g., spam calling, spam message. transmission or wireless internet communication).

SUMMARY OF THE INVENTION

Accordingly, the present invention has been made to solve the above problems of the prior art. An object of the present invention is to provide an apparatus and method for detecting that contents executed in a mobile platform of a mobile communication terminal perform a communication operation due to a malfunction by a computer virus or a program error, thereby preventing performing of the communication operation by the malfunction of the contents.

Another object of the present invention is to prevent performing of a communication operation due to an erroneous content in a mobile platform so as to prevent trying to access to communication, which is not intended by the user, and to prevent occurrence of damage such as payment of charges for communication services by unexpected communicative operation.

Yet another object of the present invention is to inform a terminal user of contents of interrupted performance and contents information of a communication operation in case of an interruption by an erroneous content in a mobile platform so that the erroneous content are processed to be deleted or preserved according to user's selection so that the terminal user can manage contents more effectively.

In accordance with an aspect of the present invention, there is provided an apparatus for detecting a communication operation caused by an erroneous content, comprising: a detection unit for detecting the performance of the communication operation caused by the erroneous content executed in a mobile platform mounted in a mobile communication terminal, and transferring information of the erroneous content and the performed communication operation to a controller; and the controller for detecting the performance of the communication operation caused by the erroneous content of the mobile platform in association with the detection unit, interrupting the performance of the communication operation caused by the erroneous content.

The apparatus may further comprise a malfunction notification unit for informing a user of an interrupt of the communicative operation due to a malfunction of the contents and displaying information of malfunctioned contents and the interrupted communicative operation.

The controller may inform the user of the interruption of the communicative operation by controlling the malfunction notification unit, and displays information of the erroneous content and the performed communication operation received from the detection unit on a terminal screen through the notification unit.

The detection unit may detect that the communication operation is caused by an erroneous content through checking whether the communication operation of a content executed in the mobile platform is performed under the terminal user's reservation or permission.

The controller may let the terminal user to delete the erroneous content according to a selection of the terminal user.

The apparatus may further comprise a function setting unit for setting or removing an interlock function of platform communication for detecting or interrupting the communication operation due to the erroneous content executed in the mobile platform, according to the user's selection.

Herein, the function setting unit may be realized in a menu-driven type or a specific key button-driven type.

In accordance with another aspect of the present invention, there is provided a method for controlling communication operation of a mobile communication terminal, comprising; detecting whether the communication operation of the mobile communication is executed by an erroneous content or not ; and interrupting the communication operation when the communication operation is executed by the erroneous content.

The method may further comprise a step of indicating information of the communication operation caused by the erroneous content.

The method may further comprise a step of indicating information of the erroneous content.

The detecting step may comprise the sub-steps of: checking all of performances of the communication operations processed in respective contents of the mobile platform; and determining whether the detected communication operation is performed under the terminal user's reservation or permission.

The method may further comprise a step of inquiring the terminal user about whether to intend to delete or preserve the erroneous content and processing to delete or preserve the erroneous content stored in a contents storage unit according to the terminal user's selection.

According to the present invention, in the event that a content performs a communication operation in a mobile platform mounted in a mobile communication terminal, it is checked whether or not the communication operation is performed under the terminal user's reservation or permission. If the content performs a communication operation such as voice calling, message transmission or wireless internet access due to an internal error of the content program even without under the user's reservation or permission, the communication operation may be detected and interrupted. In addition, in case of interruption of the performance of the communication operation, the user is informed of information on the interrupted communication operation.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
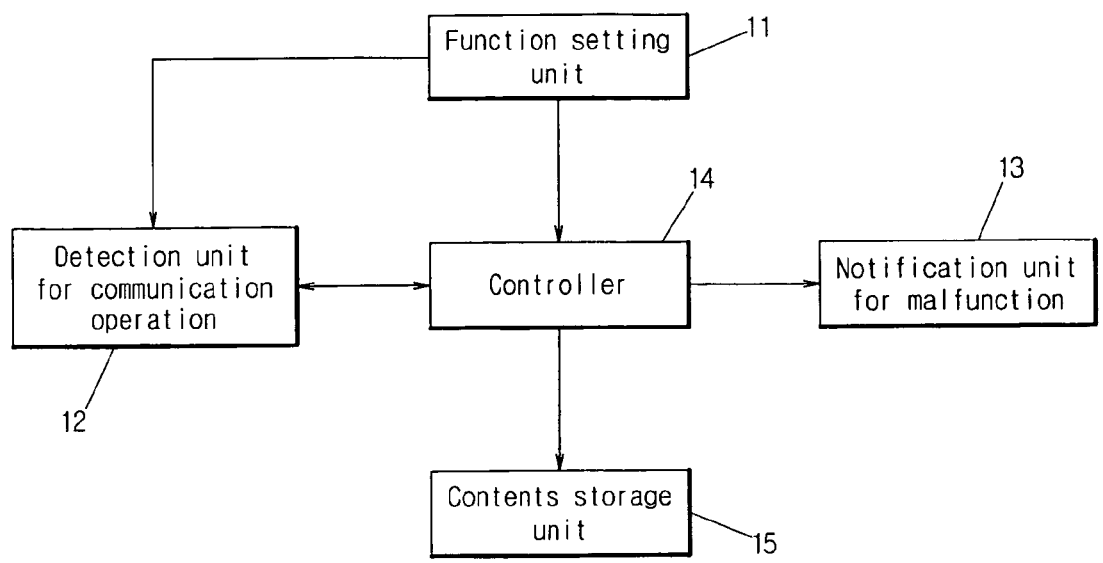
FIG. 1 is a block diagram illustrating an apparatus for detecting a communication operation in a mobile platform according to the present invention.

FIG. 1 is a block diagram illustrating an apparatus for detecting a communication operation in a mobile platform according to the present invention. As shown in FIG. 1, the apparatus for detecting a communication operation caused by an erroneous content of the mobile platform may include a function setting unit 11, a detection unit 12 for communicative operation, a notification unit 13 for malfunction, a controller 14 and a contents storage unit 15.

The function setting unit 11, according to the user's selection, serves to set or remove 'an interlock function of platform communication' for detecting or interrupting communication operations caused by the erroneous content although the user did not reserve or permit about the communicative operations. The setting or removing for the interlock function of the platform communication can be realized in a menu-driven type or a specific key button-driven type.

The detection unit 12 is activated in the case that the interlock function of the platform communication is set by the function setting unit 11 to check whether a content executed in the mobile platform is performed or not. That is, the detection unit 12 detects the performance of the communication operation due to an erroneous content during performing of the communicative operation, and then transmits information of the erroneous content and the contents of performed communication operation to the controller 14.

If the communicative operation were performed without the user's reservation or permission, the detection unit 12 decides the communicative operation as those caused by an erroneous content.

For example, the detection unit 12 may decide whether a communicative operation is performing under the user's permission through checking whether the user pressed a specific key provided in the mobile communication terminal for communicative connection referred commonly as "SEND" or "OK". If a communication operation is performed without pressing the specific key, the detection unit 12 decides that the communication operation is caused by an erroneous content.

Further, the detection unit 12 may decide whether a communicative operation is performing under the user's reservation through checking whether the user reserved a message transmission to be sent to other terminal. If a communication operation is performed without any corresponding reservation, the detection unit 12 decides that the communication operation is caused by an erroneous content. If the communication operation is ascertained as it caused by an erroneous content, the controller 14 interrupt the communicative operation.

The notification unit 13 informs the terminal user of an interruption of the communication operation due to an erroneous content visually or aurally if the interruption occurs. In this case, the notification unit displays on a terminal screen the information of the erroneous content and the performed communication operation to let the user select whether to delete the corresponding contents.

The controller 14 detects the performance of the communication operation due to an erroneous content of the mobile platform in association with the detection unit 12 in a state where the interlock function of platform communication is set by the function setting unit 11. If the communication operation caused by the erroneous content is detected, the controller 14 interrupts the performance of the corresponding communicative operation. Then, the controller controls the notification unit 13 for informing the terminal user of the fact of interrupting the communication operation. Also, the controller displays on the terminal screen the information of the erroneous content and the communication operation transmitted from the detection unit 12 by control of the notification unit 13. Further, with the user's selection, the controller 14 deletes or preserves the erroneous content stored in the contents storage unit 15.

The contents storage unit 15 stores contents downloaded through a wireless internet server.

Figure 2:
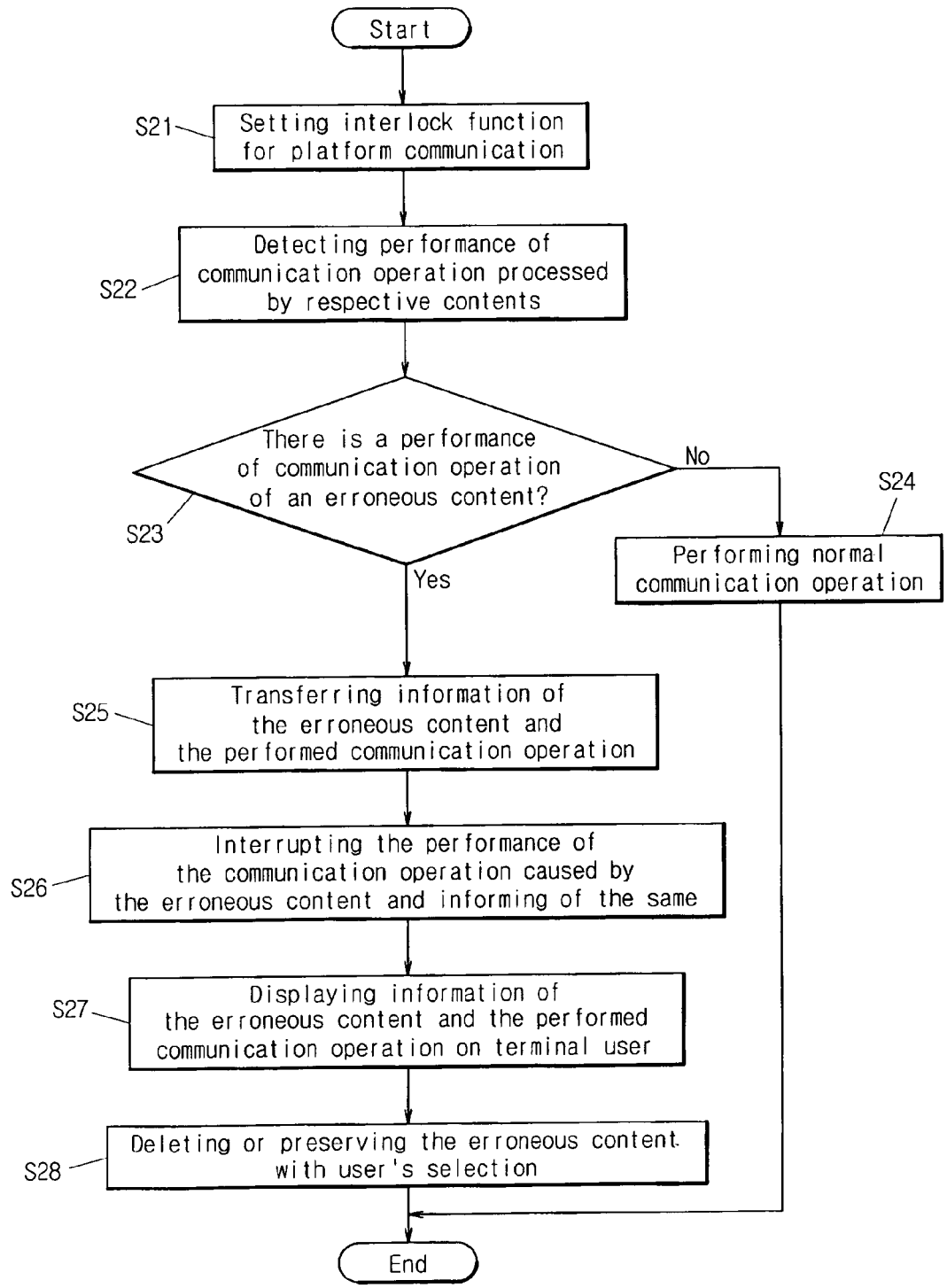
FIG. 2 is a flow chart illustrating a procedure of detecting a communication operation in a mobile platform according to the present invention.

FIG. 2 is a flow chart illustrating a procedure of detecting communication operation caused by an erroneous content in a mobile platform according to the present invention. Hereinafter, the detecting procedure will be described with reference to FIG. 2.

First, in the present invention, the setting or removing of the interlock function of platform communication for detecting or interrupting of a communication operation caused by an erroneous content of the mobile platform may be realized in a menu-driven type or a specific key button-driven type. For example, together with 'phone number menu', 'message menu' or 'wireless internet access menu' provided by the mobile communication terminal, a selection menu of the setting or removing the interlock function of the platform communication can be additionally provided. Or, the interlock function for platform communication can be set or removed by defining it through an operation of the specific key such as '#+1' or '#+0' and so forth.

In a state of capable of setting or removing the interlock function for platform communication like this, if the terminal user sets the interlock function for platform communication through the menu selection or the operation of specific key using the function setting unit 11 (S21), the detection unit 12 is thence activated to detect all of communicative operations (i.e., operations such as voice calling, message transmission, wireless internet access, etc.) processed in the respective contents of the corresponding mobile platform (S22).

Then, the detection unit 12 checks whether the communication operation processed by the respective contents is performed under the terminal user's reservation or permission, that is, whether the communication operation is caused by malfunction of any contents (S23).

As a result of the step (S23), if the communication operation detected from the detection unit 12 is not caused by an erroneous content, that is, if it is checked that the voice calling, the message transmission or the wireless internet access is attempted in a state where a series of communicative operations are reserved or permitted such that the user inputs the recipient's phone number, the wireless internet address or reservation time, etc. from the terminal user, normal communication operation is performed (S24).

However, as a result of the step (S23), if it is checked that the communication operation detected from the detection unit 12 is caused by an erroneous content, that is, if it is checked that the communication operation is performed by a malfunction of any contents without the terminal user's reservation or permission, the information of the erroneous content and the performed communication operation are transmitted to the controller 14 (S25).

Further, if the controller 14 receives the information of the erroneous content and the performed communication operation from the detection unit 12 during checking whether there is a communication operation due to the erroneous content of the mobile platform in association with the detection unit 12, the controller 14 interrupts the performance of the communication operation of the corresponding contents because it means that the performance of the communication operation due to the malfunction of the contents has been detected. Furthermore, the controller controls the notification unit 13 to visually or aurally inform the terminal user of the interruption of the communication operation (S26).

In addition, the controller 14 controls the notification unit 13 to display the information of the erroneous content and the performed communication operation received from the detection unit 12 (S27), together with the information of the notification of the interruption.

Like this, in the event of displaying on the terminal screen the information of the erroneous content and the performed communication operation caused by the malfunction of the contents, an inquiry whether the terminal user intends to deletes or preserves the erroneous content can be also displayed on the terminal screen. Herein, in case that the terminal user requests for deletion of the erroneous content for example with pressing of specific key of the mobile communication terminal, the controller 14 deletes the erroneous content from the contents storage unit 15. Then or there again, if the user does not request for deletion of the erroneous content, a detecting procedure of the present invention is terminated without deleting the corresponding contents (S28).

As described before, in the event that the content executed in the mobile platform of the mobile communication terminal perform the communication operation due to a malfunction by a computer virus or a program error, the present invention detects and interrupts the performance of the communication operation by the erroneous content. Therefore, voice calling with unspecified person, the message transmission to unspecified person or the access to arbitrary wireless internet server can be prevented, so that the payment of charges for services or other damage due to unexpected performance of the communication operation can be previously prevented.

In addition, in case of the interruption of the communication operation due to the erroneous content of the mobile platform, the present invention informs the terminal user of the information of the erroneous content and the performed communication operation so that it is possible to manage the contents more effectively such as deleting or preserving the erroneous content according to the terminal user's selection.

While the invention has been shown and described with reference to certain preferred embodiments thereof, it will be understood by those skilled in the art that various changes in form and details may be made therein without departing from the spirit and scope of the invention as defined by the appended claims. For example, a detecting system according to the present invention may be configured so that the detecting procedure for malfunctioned communication of any contents in the mobile platform can be always performed without the process of setting or removing the interlock function of the platform communication by the function setting unit 11.

What is claimed is:

1. A mobile communication terminal for detecting a communication operation caused by an erroneous content, comprising:

a function setting unit to set an interlock function of mobile platform communication, the interlock function to detect the communication operation due to the erroneous content executed in a mobile platform according to a user's selection, the function setting unit being a menu-driven type or a specific key button-driven type;
a detection unit to detect the communication operation caused by the erroneous content executed in the mobile platform mounted in the mobile communication terminal if the function setting unit is set, and to transfer information of the erroneous content and the communication operation to a controller, wherein the detection unit detects that the performance of the communication operation is caused by the erroneous content through checking whether a specific key provided with the mobile communication terminal is pressed for a communicative connection;
the controller to interrupt the performance of the communication operation caused by the erroneous content if the specific key provided with the mobile communication terminal is not pressed for the communicative connection; and
a malfunction notification unit to inform the user of an interrupt of the communicative operation due to a malfunction of the erroneous content and to display information of the erroneous content and the interrupted communicative operation,
wherein the controller causes the malfunction notification unit to aurally inform the user of the interruption of the communicative operation, inquires whether to delete or preserve the erroneous content, and processes to delete or preserve the erroneous content stored in a contents storage unit according to a terminal user's selection, and
wherein the controller informs the user of the interruption of the communicative operation by controlling the malfunction notification unit, and displays information of the erroneous content and the performed communication operation received from the detection unit on a terminal screen through the malfunction notification unit.

2. A mobile communication terminal for detecting a communication operation caused by an erroneous content, comprising:

a function setting unit to set an interlock function of mobile platform communication, the interlock function to detect the communication operation due to the erroneous content executed in a mobile platform according to a user's selection, the function setting unit being a menu-driven type or a specific key button-driven type;
a detection unit to detect the communication operation caused by the erroneous content executed in the mobile platform mounted in the mobile communication terminal if the function setting unit is set, wherein the detection unit detects that the performance of the communication operation is caused by the erroneous content through checking whether a user's reservation for a message transmission to be sent to another terminal is set in the mobile communication terminal;
a controller to interrupt the performance of the communication operation caused by the erroneous content if the user's reservation for a message transmission to be sent to the other terminal is not set in the mobile communication terminal; and
a malfunction notification unit to inform the user of an interrupt of the communicative operation due to a malfunction of the erroneous content and to display information of the erroneous content and the interrupted communicative operation,
wherein the controller causes the malfunction notification unit to aurally inform the user of the interruption of the communicative operation, inquires whether to delete or preserve the erroneous content, and processes to delete or preserve the erroneous content stored in a contents storage unit according to a terminal user's selection, and
wherein the controller informs the user of the interruption of the communicative operation by controlling the malfunction notification unit, and displays information of the erroneous content and the performed communication operation received from the detection unit on a terminal screen through the malfunction notification unit.

* * * * *